(12) United States Patent
Wagner et al.

(10) Patent No.: US 9,108,678 B2
(45) Date of Patent: Aug. 18, 2015

(54) VEHICLE SUPPORT FRAMES WITH INTERLOCKING FEATURES FOR JOINING MEMBERS OF DISSIMILAR MATERIALS

(75) Inventors: David Anthony Wagner, Northville, MI (US); Michael M. Azzouz, Livonia, MI (US); Ari Garo Caliskan, Canton, MI (US); Xiaoming Chen, Canton, MI (US); John Edward Huber, Novi, MI (US); Yuksel Gur, Ann Arbor, MI (US); Sunil K. Kasaragod, Canton, MI (US); Parameswararao Pothuraju, Canton, MI (US); Jeffery Wallace, Walled Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 13/545,584

(22) Filed: Jul. 10, 2012

(65) Prior Publication Data

US 2013/0026794 A1    Jan. 31, 2013

Related U.S. Application Data

(63) Continuation of application No. 13/239,592, filed on Sep. 22, 2011, and a continuation of application No. 13/221,142, filed on Aug. 30, 2011.

(60) Provisional application No. 61/512,559, filed on Jul. 28, 2011.

(51) Int. Cl.
*B62D 21/00* (2006.01)
*B62D 21/02* (2006.01)
(Continued)

(52) U.S. Cl.
CPC ............ *B62D 21/02* (2013.01); *B23K 26/28* (2013.01); *B23K 31/02* (2013.01); *B23K 33/006* (2013.01); *B23K 33/008* (2013.01);
(Continued)

(58) Field of Classification Search
CPC ........ B62D 21/02; B23K 26/28; B23K 31/02; B23K 33/006; B23K 33/008
USPC ................. 296/203.01, 29; 403/300; 285/417
See application file for complete search history.

(56) References Cited

U.S. PATENT DOCUMENTS 3,353,852 A * 11/1967 Wood ............................ 403/189
3,943,616 A *  3/1976 Smith et al. ................ 29/890.14
(Continued)

FOREIGN PATENT DOCUMENTS

DE          19538803          4/1996
DE          19603956          8/1997
(Continued)

OTHER PUBLICATIONS

Hak-Sung Kim, Torque Transmission Characteristics of the Press Fit Joint Between the Aluminum Shaft and Steel Right with Small Teeth, Mechanics Based Design of Structures and Machines, Jan. 28, 2011, vol. 39, Issue 1, http://www.tandfonline.com/doi/abs/10.1080/15397734.2011.538655.

*Primary Examiner* — Glenn Dayoan
*Assistant Examiner* — Melissa A Black
(74) *Attorney, Agent, or Firm* — Raymond L. Coppiellie; Brooks Kushman P.C.

(57) ABSTRACT

The present disclosure relates to various vehicle frame assemblies and methods of manufacturing the same. The vehicle frame assemblies have rails composed of dissimilar materials.

13 Claims, 6 Drawing Sheets

(51) Int. Cl.
*B23K 26/28* (2014.01)
*B23K 31/02* (2006.01)
*B23K 33/00* (2006.01)
*B32B 37/12* (2006.01)

(52) U.S. Cl.
CPC ...... *B32B 37/1284* (2013.01); *B23K 2201/006* (2013.01); *B23K 2201/185* (2013.01); *B23K 2201/28* (2013.01); *B23K 2203/08* (2013.01); *B23K 2203/18* (2013.01); *B23K 2203/20* (2013.01); *Y10T 29/49622* (2015.01); *Y10T 29/49826* (2015.01); *Y10T 29/49956* (2015.01); *Y10T 156/1002* (2015.01); *Y10T 156/1051* (2015.01)

(56) References Cited

U.S. PATENT DOCUMENTS

| | | | |
|---|---|---|---|
| 4,131,980 | A | 1/1979 | Zinnbauer |
| 4,471,519 | A | 9/1984 | Capello et al. |
| 4,858,958 | A * | 8/1989 | Harbeke ............. 285/31 |
| 5,427,198 | A | 6/1995 | Walsh |
| 5,470,416 | A | 11/1995 | Herring, Jr. et al. |
| 5,865,362 | A | 2/1999 | Behrmann et al. |
| 5,996,813 | A | 12/1999 | Hendrix et al. |
| 6,000,118 | A | 12/1999 | Biernat et al. |
| 6,148,581 | A * | 11/2000 | Separautzki ........... 52/653.2 |
| 6,299,210 | B1 | 10/2001 | Ruehl et al. |
| 6,696,147 | B1 | 2/2004 | Herring, Jr. et al. |
| 6,701,598 | B2 | 3/2004 | Chen et al. |
| 6,922,882 | B2 | 8/2005 | Shah et al. |
| 7,127,816 | B2 | 10/2006 | Kiehl |
| 7,144,040 | B2 | 12/2006 | Kiehl et al. |
| 7,267,736 | B2 | 9/2007 | Hou et al. |
| 7,517,425 | B2 | 4/2009 | Schroeder et al. |
| 7,654,571 | B2 | 2/2010 | Gabbianelli et al. |
| 8,146,930 | B2 | 4/2012 | Sicilia et al. |
| 8,528,803 | B2 | 9/2013 | Ohashi et al. |
| 2002/0170766 | A1 | 11/2002 | Gantz et al. |
| 2005/0133483 | A1 | 6/2005 | Hou et al. |
| 2005/0263568 | A1 * | 12/2005 | Stol ..................... 228/107 |
| 2006/0032895 | A1 | 2/2006 | Durand et al. |
| 2008/0296433 | A1 | 12/2008 | Brenner et al. |
| 2009/0188206 | A1 | 7/2009 | Stol et al. |
| 2010/0289300 | A1 | 11/2010 | Kokubo |
| 2011/0018248 | A1 | 1/2011 | Cordea |
| 2012/0068499 | A1 | 3/2012 | Mildner et al. |
| 2013/0026794 | A1 | 1/2013 | Wagner et al. |
| 2013/0229005 | A1 | 9/2013 | Knittel et al. |

FOREIGN PATENT DOCUMENTS

| | | | |
|---|---|---|---|
| DE | 10311946 | | 10/2003 |
| DE | 60111777 | | 2/2006 |
| DE | 102004044017 | | 3/2006 |
| DE | 10329017 | | 12/2008 |
| DE | 102010045586 | | 3/2012 |
| EP | 1506908 | A3 | 8/2004 |
| EP | 1854704 | A1 | 5/2007 |
| JP | 2007222877 | | 9/2007 |
| WO | WO9639322 | A1 | 6/1996 |
| WO | 9839174 | | 11/1998 |
| WO | 0247959 | | 6/2002 |
| WO | WO2009094090 | | 7/2009 |

* cited by examiner

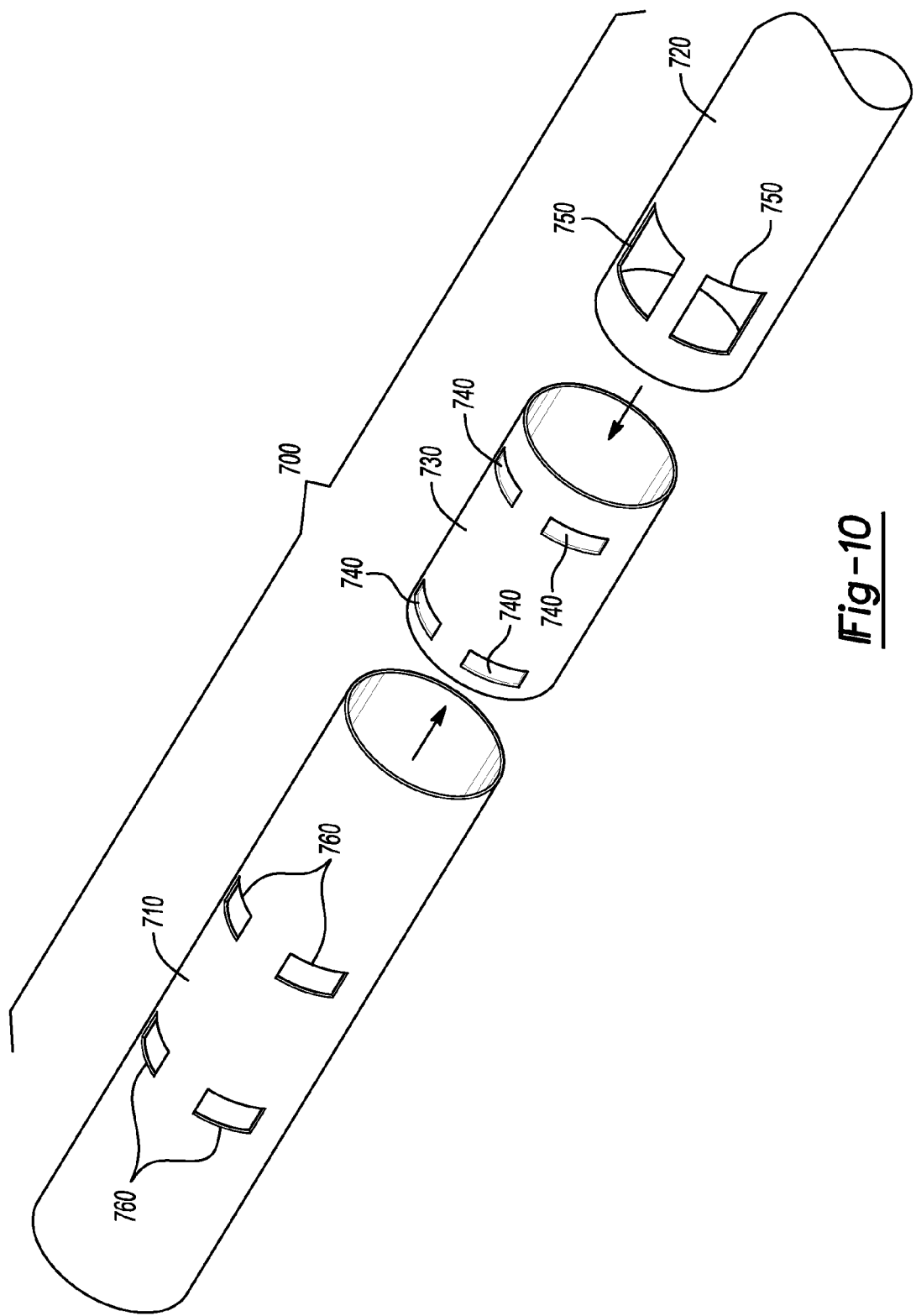

VEHICLE SUPPORT FRAMES WITH INTERLOCKING FEATURES FOR JOINING MEMBERS OF DISSIMILAR MATERIALS

CROSS-REFERENCE TO RELATED APPLICATIONS

This application is a continuation and claims the benefit of U.S. Patent Provisional Application Ser. No. 61/512,559 titled "Vehicle Support Frames with Interlocking Features for Joining Members of Dissimilar Materials" filed Jul. 28, 2011, U.S. patent application Ser. No. 13/221,142 titled "Vehicle Support Frames with Interlocking Features for Joining Members of Dissimilar Materials" filed Aug. 30, 2011, now U.S. Pat. No. 8,915,530, and U.S. patent application Ser. No. 13/239,592 titled "Vehicle Support Frames with Interlocking Features for Joining Members of Dissimilar Materials" filed Sep. 22, 2011, which are hereby incorporated by reference in their entirety.

TECHNICAL FIELD

The present disclosure relates to vehicle support frames with members having dissimilar materials and methods for manufacturing the same.

BACKGROUND

Conventional vehicle support frames can be composed of different materials including, for example, steel, aluminum and reinforced polymer composites. Vehicle manufacturers attempt to strike the balance between weight reduction and structural rigidity. It is desirable to design lightweight vehicle frames for full-sized light trucks. Aluminum structural members can be designed to achieve up to 50% weight reduction while still meeting performance targets. Joining aluminum members to steel frame rails presents challenges as the two materials, when welded, have limited structural integrity.

One existing reference teaches the use of an overlapping configuration for the rails of dissimilar materials. A first and second structural member sandwiches one end of a third structural member and adhesive is applied therebetween. The second structural member is thereafter welded to the first structural member. U.S. Patent Publication No. 2009/0188206, titled "System and Method for Joining Dissimilar Materials" teaches an overlapping configuration with a surface weld on the second structural member. Still, it is desirable to improve this design by providing a point of access for spot weld fixtures or other weld fixtures that require a clamped fitting.

Another patent publication, U.S. Patent Publication No. 2006/0032895, titled "Method for Joining Axle Components" discusses joining two tubes composed of the same or dissimilar materials using magnetic forming. This process uses a forming band placed at an opposite end of an electromagnetic actuator in order to form multiple tubes; therefore, configuration options are limited for this assembly. This process is also more expensive and requires more energy than most welding and/or mechanical locking techniques.

Therefore, it is desirable to have improved interconnecting techniques for joining two structural members composed of dissimilar materials.

SUMMARY

The present disclosure addresses one or more of the above-mentioned issues. Other features and/or advantages will become apparent from the description which follows.

One exemplary embodiment of the present disclosure relates to a vehicle frame assembly, including: a first rail composed of a first material; a second rail composed of a second material; and an interconnecting member having a first portion welded to the first rail and a second portion welded to the second rail. The first and second portions are attached.

Another exemplary embodiment of the present disclosure relates to an interconnecting member for joining vehicle structural rails composed of different materials, having: a first portion composed of a material weld-compatible with a first material; and a second portion composed of material weld-compatible with a second material. The first and second portions are attached.

Yet another exemplary embodiment of the present disclosure relates to a vehicle frame assembly, including: a first rail composed of a first material having a first orifice; an interconnecting member having a second orifice aligned with the first orifice; and a second rail composed of a second material, sandwiched between the interconnecting member and the first rail. The second rail includes a third orifice aligned with the first and second orifices thereby enabling weld access through the orifices.

Another exemplary embodiment of the present disclosure relates to a method of manufacturing a vehicle frame assembly, the method including: attaching a first portion of an interconnecting member to a second portion of an interconnecting member; welding the first portion to a first rail; and welding the second portion to a second rail.

Another exemplary embodiment of the present disclosure relates to a method of manufacturing a vehicle frame assembly, the method including: forming a weld-access orifice in an interconnecting member; forming weld-access orifices in a first rail and a second rail; sandwiching the first rail between the second rail and the interconnecting member; aligning the weld-access orifices of the interconnecting member, first rail and second rail; and attaching the first rail, second rail and interconnecting member by welding the interconnecting member to the second rail through the weld-access orifices.

One advantage of the present disclosure is that it enables the use of welding techniques to join two or more frame assembly components composed of dissimilar materials. This disclosure teaches the use of an interconnecting member between frame components that can have two different portions of differing material composition that are attached. Each frame component can be attached to a portion of the interconnecting member using a simple mechanical attachment technique, e.g., welding.

Another advantage of the present disclosure is that it teaches the manufacture and use of light-weight vehicle structural frames that can be utilized with vehicles of different sizes, including full-sized truck frames. The weight reduction for the disclosed frame assemblies compared to contemporary structural frames can be as great as 50%. Fuel efficiency and performance can be enhanced by the use of the disclosed frame assemblies.

Another advantage of the present disclosure is that it teaches joining techniques for structural members having dissimilar material composition and a closed-section configuration. Structural members can be positioned at any angle with respect to each other.

Joining vehicle frame assembly rails composed of dissimilar materials will be explained in greater detail below by way of example with reference to the figures, in which the same reference numbers are used in the figures for identical or essentially identical elements. The above features and advantages and other features and advantages of the present teachings are readily apparent from the following detailed description for carrying out the invention when taken in connection with the accompanying drawings. In the figures:

BRIEF DESCRIPTION OF THE DRAWINGS

FIG. 10 is an exploded view of the rails and interconnecting member of FIG. 9.

DETAILED DESCRIPTION

Figure 1:
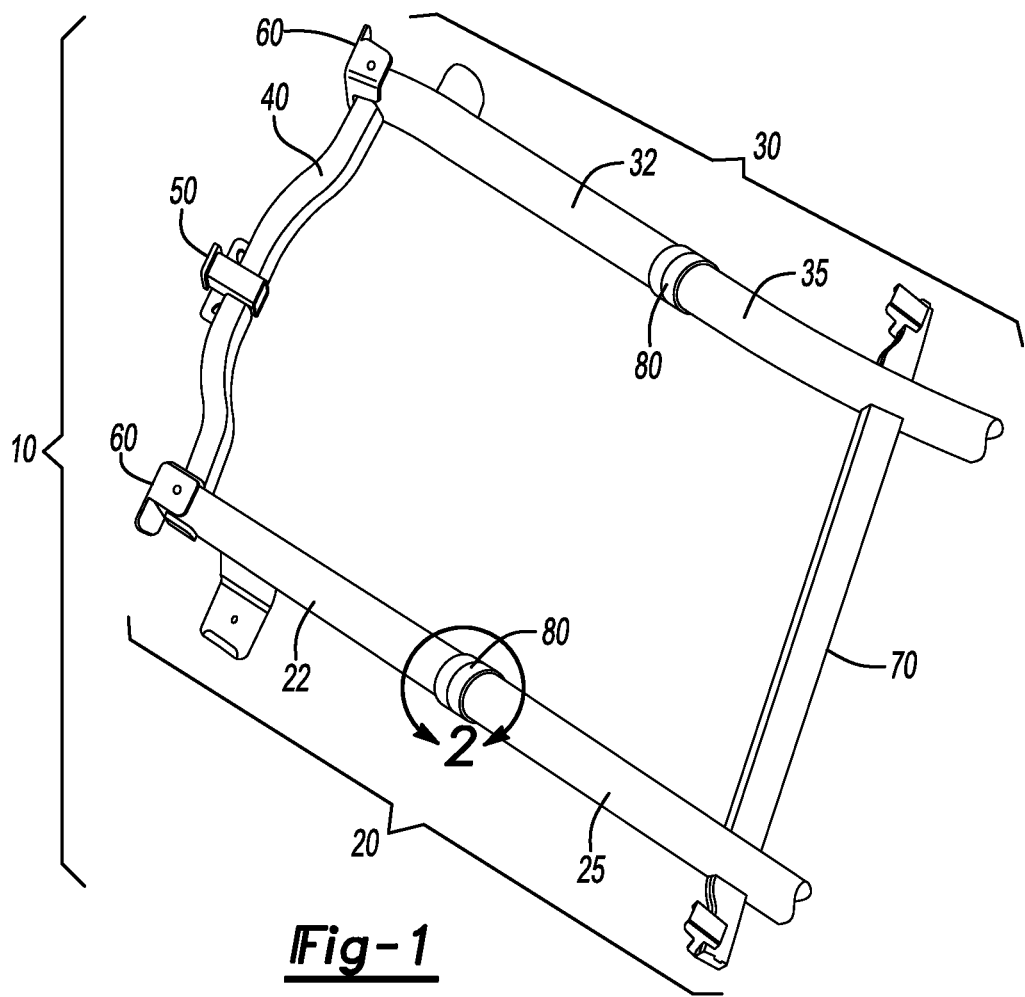
FIG. 1 is a top perspective view of a vehicle support frame assembly.

Referring to the drawings, wherein like characters represent examples of the same or corresponding parts throughout the several views, there are shown vehicle support frames having joined structural members composed of different materials. Particularly, lighter weight aluminum structural members are joined to steel side rails in most embodiments. The aluminum and steel members are joined through an interconnecting member juxtaposed between them. The disclosed interconnecting members mitigate several challenges incumbent with joining dissimilar materials by teaching an interconnecting member having multiple portions. Each portion can be composed of a different material. Once attached to each other the portions form as a link or bridge between rails attached to a portion of the interconnecting member. In some embodiments, the rails are attached to the interconnecting member via MIG welding.

The teachings herein are applicable to any type of vehicle frame including frames for pickup trucks, vans, minivans, sports utility vehicles, sedans, coupes, commercial vehicles, and all utility vehicles.

Referring now to FIG. 1, there is shown therein a vehicle support frame 10. The illustrated support frame 10 is configured for use in a pickup truck. Support frame 10 (as shown) is taken from the rear section of the truck frame, which supports the truck bed (not shown). Side rail assemblies 20 and 30 extend longitudinally with respect to the assembly and the vehicle. In the shown embodiment, side rail assemblies 20, 30 can be composed of different materials. In this embodiment side rail assembly 20 includes two rails 22, 25. Rail 22 is composed of aluminum and rail 25 is composed of steel. Side rail assembly 30 includes two rails 32, 35. Rail 32 is composed of aluminum and rail 35 is composed of steel. Rails 22, 25, 32, and 35 can be formed via any standard forming process, e.g., stampings, hydro-forms, or roll forming. The rearward ends of the rails 22, 32 are interconnected through a rearward steel cross-member 40. Attached to cross-member 40 is a tow hitch 50. Each end of the rails 22, 32 is fitted with a side bracket 60 for interconnecting cross-member 40 with the rails and for connecting the rails to other vehicle structure (e.g., the truck bed, rear fascia or bumper, etc.). At the frontward end of the support frame 10, shown in FIG. 1, there is another steel cross-member 70 intersecting each side rail 25, 35. As shown, rails 25, 35 are welded to cross-member 70.

Rail assemblies 20 and 30 are fitted with an interconnecting member 80, as discussed hereinbelow. Interconnecting members 80 are attached to the rails 22, 25, 32 and 35 in each rail assembly 20, 30. In this embodiment, interconnecting members includes two attached portions and facilitate collinear mounting of two rails. Interconnecting members 80 are each welded to rails 22, 25 and 32, 35.

Figure 2:
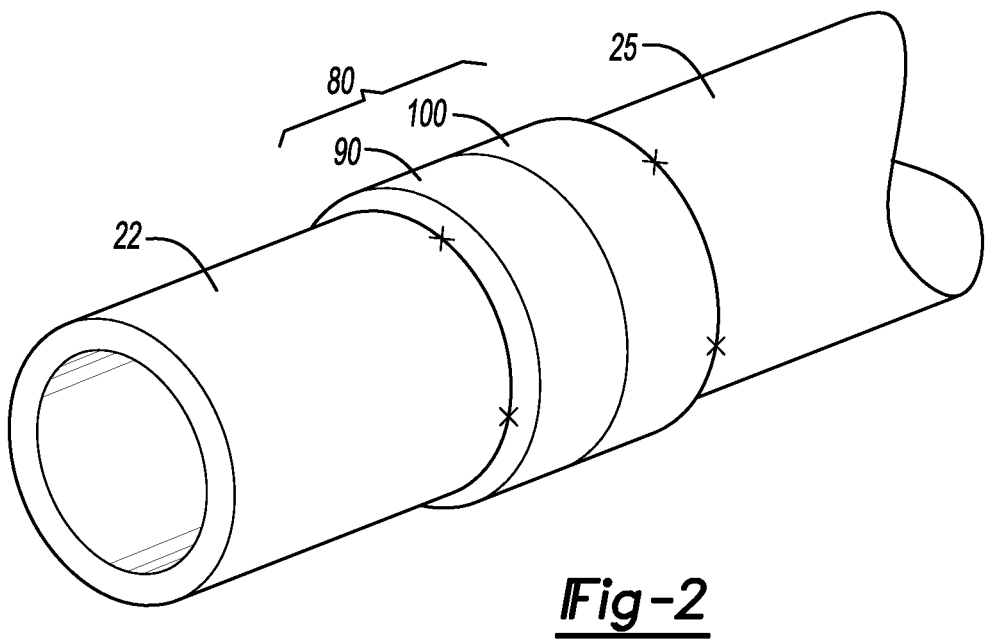
FIG. 2 is a perspective view of joined rails in the support frame of assembly of FIG. 1 at Circle 2, joined by an interconnecting member according to an exemplary embodiment of the present disclosure.
Figure 3:
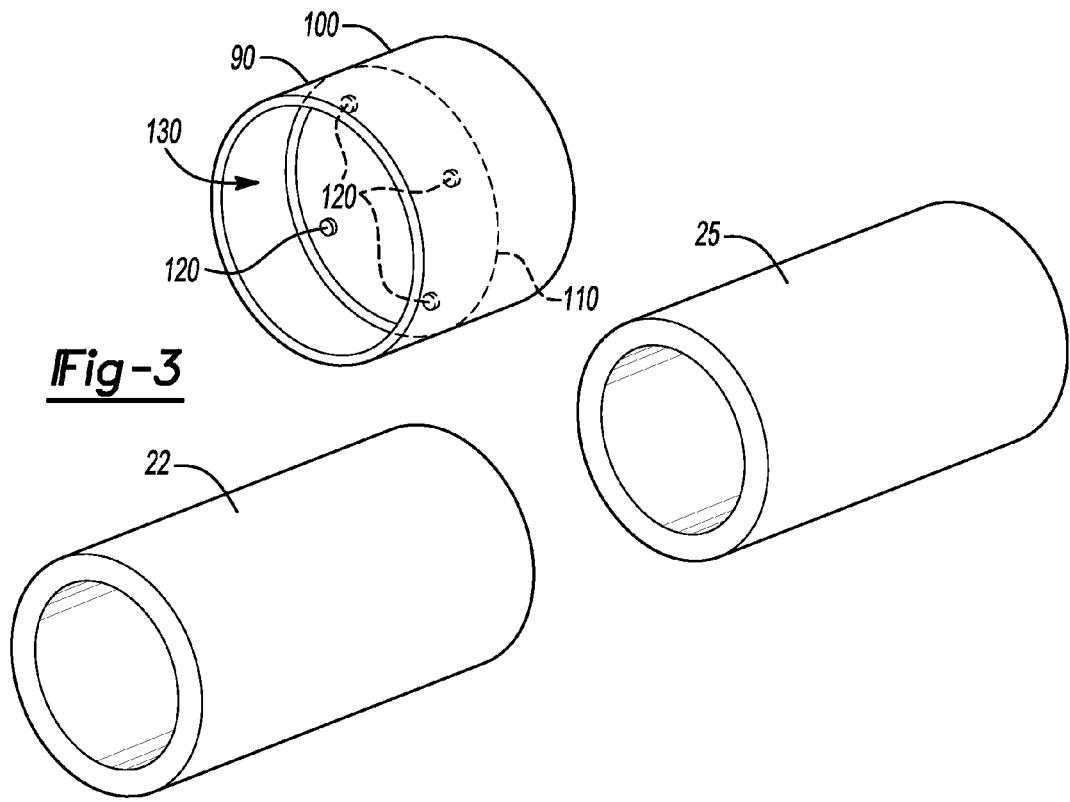
FIG. 3 is an exploded view of the rails and interconnecting member of FIG. 2.

Interconnecting member 80 of FIG. 1 is further discussed with respect to FIGS. 2 through 3. As shown in FIGS. 2 and 3, interconnecting member 80 includes portion 90 and portion 100. Portions 90, 100 are attached at surface 110 of portion 90. In this embodiment, fasteners 120 are used to attach portions. Four fasteners are used in this embodiment. The fasteners 120 are rivets. In other embodiments, different fasteners are used including, for example, adhesives, screws or nuts and bolts. Additionally, more or fewer fasteners can be used than what is shown in the illustrated embodiment.

Each portion 90, 100, as shown in FIGS. 2-3, forms a receptor (e.g., 130 as shown in FIG. 3). Receptors 130 have cavities sized so that at least a portion of rails 22 or 25 can fit therein. In this embodiment, receptors 130 are cups or have a cupped configuration at one end. An end of rail 22 is fitted in receptor 130 and an end of rail 25 is fitted into a comparative receptor in portion 100. After the rail 22 or 25 is fitted in the receptor, the rail is attached to interconnecting member 80.

In the embodiment of FIGS. 2-3, portions 90, 100 are attached to rails 22, 25 via a welding process. A MIG weld is used to attach portion 90 to rail 22 at the locations marked with an "X" on rail 22 in FIG. 2. A MIG weld is also used to attach portion 100 to rail 25 at the locations marked with "X" on rail 25 in FIG. 2. Portion 90 is composed of a material that is suitable or compatible for welding to the material composition of rail 22. Rail 22 is composed of aluminum or an aluminum composite. Portion 90 is also composed of aluminum or an aluminum composite. Portion 90 can be formed of other materials and be weld-compatible with the aluminum rail 22. Exemplary materials include nickel or aluminum.

Portion 100, as shown in FIGS. 2 and 3, is composed of a material that is suitable or compatible for welding to the material composition of rail 25. Rail 25 is composed of steel. Portion 100 is also composed of steel. Portion 100 can be formed of other materials and be weld-compatible with the steel rail 25. Exemplary materials include tungsten or steel.

Figure 4:
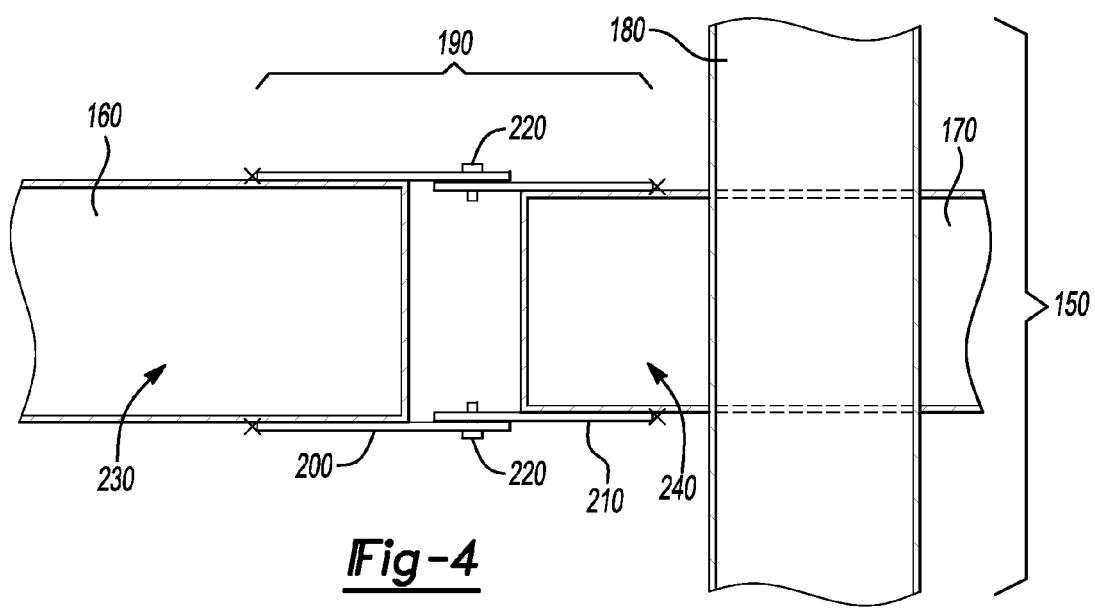
FIG. 4 is a top cross-sectional view of joined rails for a vehicle support frame according to another exemplary embodiment of the present disclosure.

Now with reference to the embodiment shown in FIG. 4, there is shown therein a vehicle frame assembly 150 according to another exemplary embodiment of the present disclosure. FIG. 4 is a cross-sectional view of the frame assembly 150. This section of the assembly includes two rails 160, 170 collinearly arranged and a cross-member 180 intersecting rail 170. Rails 160, 170 are attached via interconnecting member 190. Interconnecting member 190 includes portion 200 and portion 210. Portions 200, 210 are attached via a fastener 220. The fastener 220 is a rivet. In other embodiments, different fasteners are used. Additionally, more or fewer fasteners can be used than what is shown in the illustrated embodiment.

Each portion 200, 210, as shown in FIG. 4, forms a receptor 230, 240, respectively. Receptors 230, 240 are tubes. Portion 200 has a receptor 230 sized to fit portion 210 therein. Portion 210 has a receptor 240 sized to fit the end of rail 170 therein. Portion 200 also has a receptor 230 sized to fit end of rail 160 therein. Portions 200, 210 and receptors 230, 240 form open-ended tubes. Openings are cut evenly along a periphery on all three surfaces of portions and rails.

Portion 200, as shown in FIG. 4, is attached to rail 160 via a welding process. A MIG weld is used to attach portion 200 to rail 160 at the locations marked with an "X" on rail 160. A MIG weld is also used to attach portion 210 to rail 170 at the locations marked with "X" on rail 170. Portion 200 is composed of a material that is suitable or compatible for welding to the material composition of rail 160. Rail 160 is composed of aluminum or an aluminum composite. Portion 200 is also composed of aluminum or an aluminum composite. Portion 200 can be formed of other materials and be weld-compatible with the aluminum rail 160.

Portion 210, as shown in FIG. 4, is composed of a material that is suitable or compatible for welding to the material composition of rail 170. Rail 170 is composed of steel. Portion 210 is also composed of steel. Portion 210 can be formed of other materials and be weld-compatible with the steel rail 170. Interconnecting member 190 enables weld attachments to be used with each rail 160 and 170.

Figure 5:
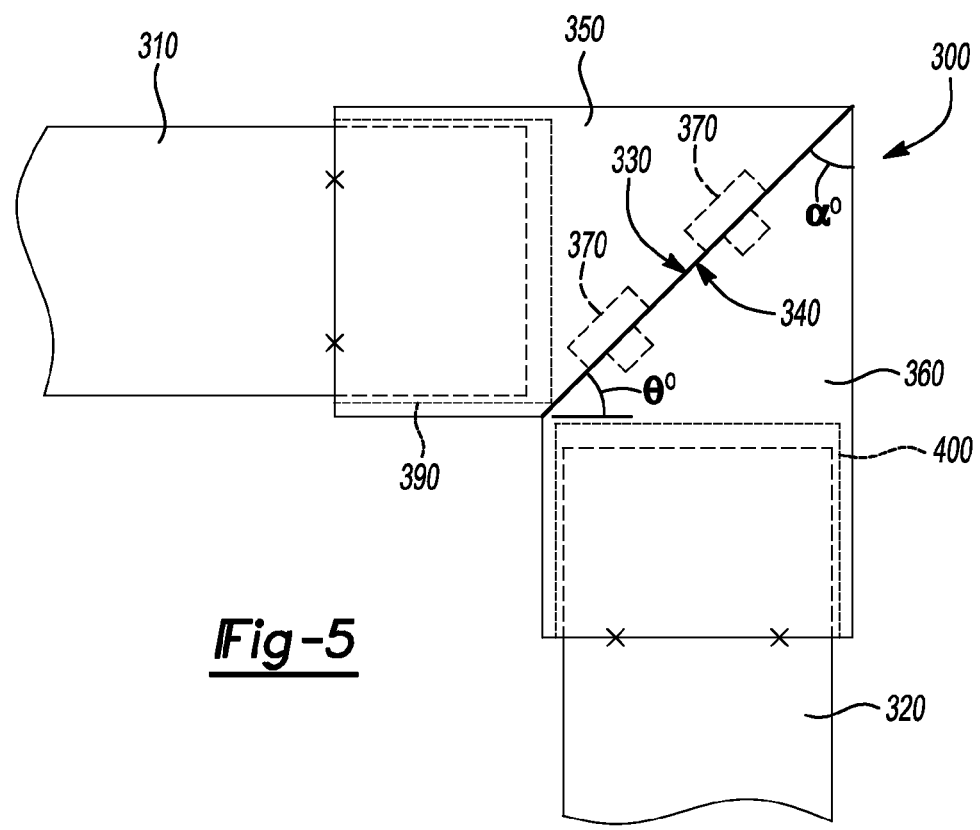
FIG. 5 is a top view of joined rails for a vehicle support frame according to another exemplary embodiment of the present disclosure.
Figure 6:
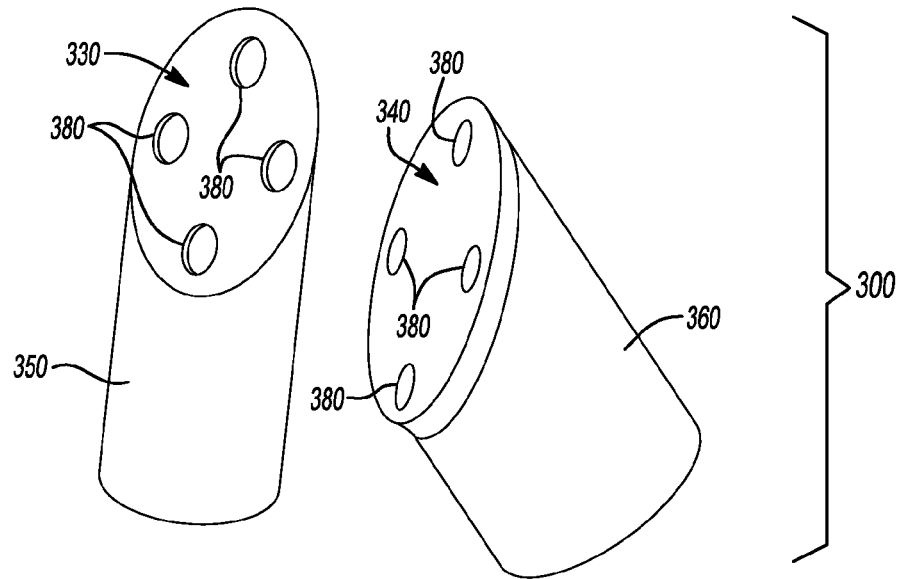
FIG. 6 is an exploded view of the interconnecting member of FIG. 5.

Other types of interconnecting members can be used to enable two or more rails to be secured via welding. For example, FIGS. 5-6 illustrate another exemplary interconnecting member 300 that positions connected rails 310, 320 at an angular disposition with respect to one another. Interconnecting member 300 includes angled connecting surfaces 330 and 340 between portion 350 and portion 360, as shown in FIG. 6. In this embodiment, the pitch of surfaces 330, 340 are defined by theta, θ, and alpha, α. As shown, in this embodiment, theta and alpha are identical. In other embodiments, theta and alpha are different. Rail 310 and 320 are positioned at a 90 degree angle with respect to each other.

Interconnecting member, as shown in FIGS. 5-6 includes portion 350 and portion 360. Portion 350 and 360 are attached via four fasteners 370. The fasteners 370 are rivets. Each portion 350, 360 include orifices 380 through which fasteners 370 can fit. In other embodiments, different fasteners are used. Additionally, more or fewer fasteners can be used than what is shown in the illustrated embodiment.

Each portion 350, 360, as shown in FIGS. 5-6, forms a receptor 390, 400. Receptors 390, 400 are cups. Portion 350 has a receptor 390 sized to fit an end of rail 310 therein. Portion 360 has a receptor 400 sized to fit an end of rail 320 therein. Portion 350 is attached to rail 310 via a welding process. A MIG weld is used to attach portion 350 to rail 310 at the locations marked with an "X" on rail 310. A MIG weld is also used to attach portion 360 to rail 320 at the locations marked with "X" on rail 320. Portion 350 is composed of a material that is suitable or compatible for welding to the material composition of rail 310. Rail 310 is composed of aluminum or an aluminum composite. Portion 350 is also composed of aluminum or an aluminum composite. Portion 360, as shown in FIGS. 5 and 6, is composed of a material that is suitable or compatible for welding to the material composition of rail 320. Rail 320 is composed of steel. Portion 360 is also composed of steel.

Figure 7:
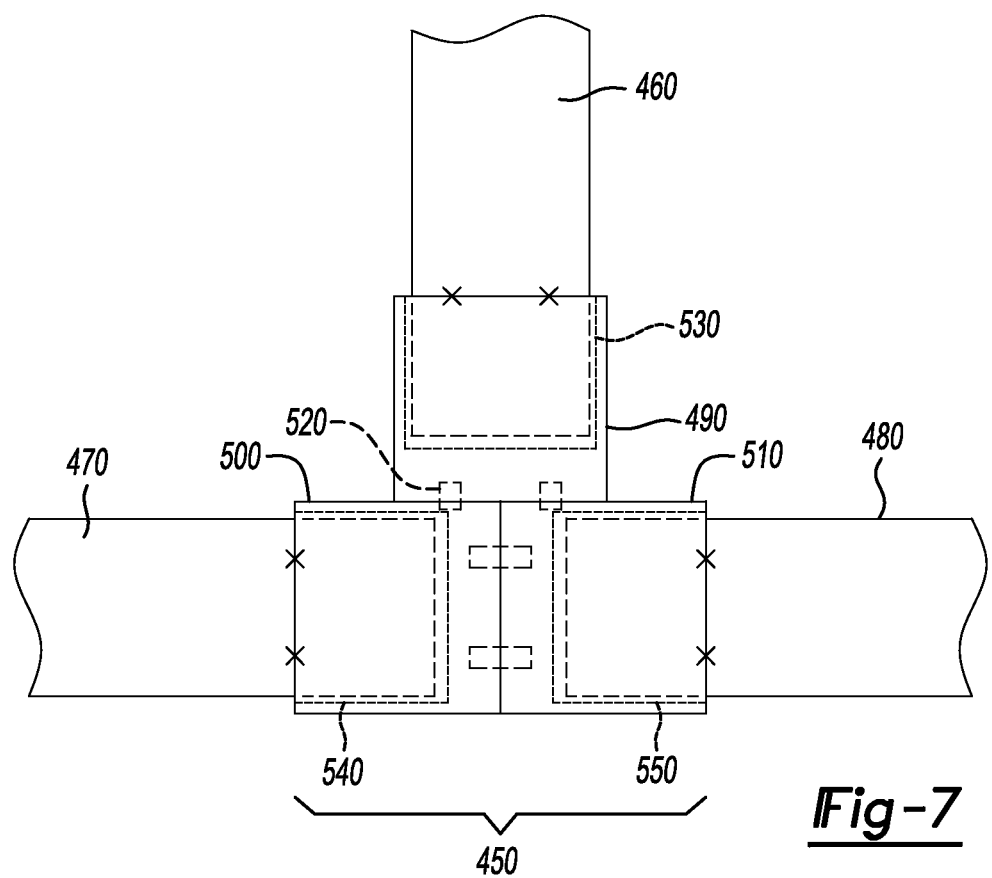
FIG. 7 is a top view of joined rails for a vehicle support frame according to another exemplary embodiment of the present disclosure

In another exemplary embodiment, an interconnecting member 450 enables three rails 460, 470 and 480 of differing material composition to be secured together. As assembled, interconnecting member 450, as shown in FIG. 7, forms a T-shape. Rails 460 and 470 are positioned at a 90 degree angle with respect to each other. Rail 460 and 480 are positioned at a 90 degree angle with respect to each other. Rails 470 and 480 are collinearly arranged. Interconnecting member 450 includes portions 490, 500 and 510. Portions 490, 500 are attached via fastener 520. As shown, fastener 520 is a rivet. Each portion 490, 500 and 510 forms a receptor 530, 540 and 550, respectively. Receptors 530, 540 and 550 are cups. Portion 490 has a receptor 530 sized to fit an end of rail 460 therein. Portion 500 has a receptor 540 sized to fit an end of rail 470 therein. Portion 510 has a receptor 550 sized to fit an end of rail 480 therein. Portion 490 is attached to rail 460 via a welding process. A MIG weld is used to attach each portion 490, 500 and 510 to each rail 460, 470 and 480, respectively, at the locations marked with an "X." Portions and rails are composed of a material(s) that are suitable for welding. Rail 460 is composed of aluminum or an aluminum composite. Portion 490 is also composed of aluminum or an aluminum composite. Rail 470 is composed of steel. Portion 500 is also composed of steel. Rail 480 is composed of titanium and portion 510 is composed of tungsten.

Figure 8:
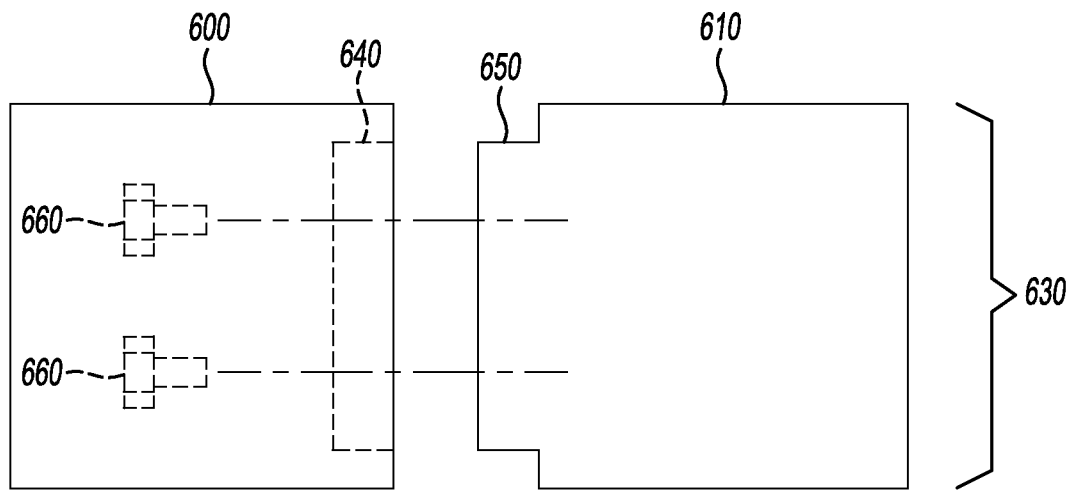
FIG. 8 is an exploded view of an interconnecting member according to another exemplary embodiment of the present disclosure.

Additionally, receptors in interconnecting members can be formed with interlocking features that complement their fastening or attachment. For example, in FIG. 8 there is shown two portions 600, 610 for an interconnecting member 630. Interconnecting member 630 is configured to attach rails collinearly with respect to each other. Portion 600 includes an inner groove 640 into which a lip or tiered surface 650 of portion 610 can fit. The minor edge of lip 650 reduces bending forces against the inner surface of the interconnecting member 630.

Portions 600, 610 are attached via two fasteners 660. As shown, fasteners 660 are rivets. Each portion forms a receptor such as a cup formed therein. Portions 600 and 610 are composed of material(s) that are suitable or compatible for welding to structural rails.

Figure 9:
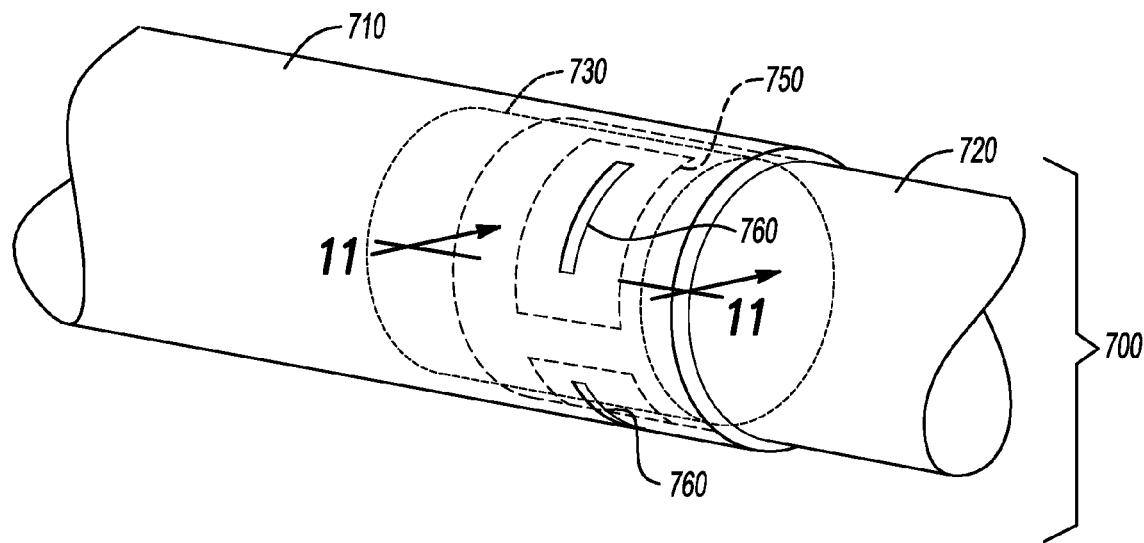
FIG. 9 is a perspective view of joined rails for a vehicle support frame according to another exemplary embodiment of the present disclosure.
Figure 11:
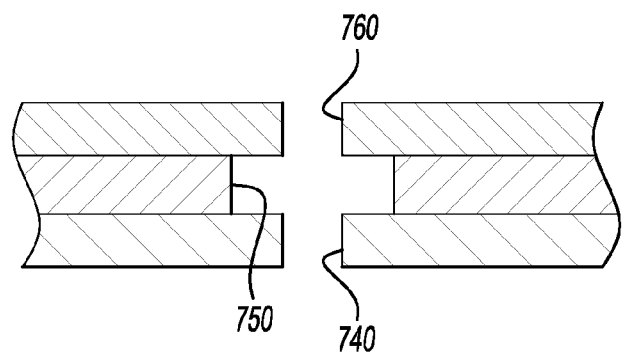
FIG. 11 is a cross-sectional view of the joined rails of FIG. 9 at Line 11-11.

Now with reference to FIGS. 9-11 there is shown another alternative embodiment of a vehicle frame assembly 700. The frame assembly 700 includes two rails 710, 720 collinearly attached via an interconnecting member 730. Rail 720 is sandwiched between the interconnecting member 730 and rail 710. Interconnecting member 730 and rail 710 are subsequently secured together through welding or another fastening process. All three elements include orifices that, when assembled, are aligned so as to provide fastening tool access within the assembly.

As shown in FIG. 10, rail 720 is journaled onto interconnecting member 730. Interconnecting member 730 includes an orifice 740 for weld gun access. Rail 720 includes another orifice 750 aligned with interconnecting member 730. Rail 710 is journaled onto rail 720. Rail 710 also includes an orifice 760 for weld access. Orifice 750 is configured slightly larger than orifices 740, 760. As shown in FIG. 11, orifices 740, 750 and 760 enable different types of weld apparatus to be used, e.g., spot welding. Rail 710 and interconnecting member 730 are composed of materials that are weld-compatible. E.g., steel-to-steel or tungsten-to-steel.

Also disclosed are methods of manufacturing different embodiments of vehicle frame assemblies some of which were previously discussed. A first method of manufacturing a vehicle frame assembly includes the following steps: attaching a first portion of an interconnecting member to a second portion of an interconnecting member (e.g., as discussed with respect to FIGS. 2-8); welding the first portion to a first rail; and welding the second portion to a second rail. The method enables structural rails of different material compositions to be joined via a welding process. The method can include forming a portion to be a receptor; and inserting a rail in the portion.

Another exemplary method of manufacturing a vehicle frame assembly includes: forming a weld-access orifice in an interconnecting member; sandwiching a first rail between a second rail and the interconnecting member; and attaching the first rail, second rail and interconnecting member by welding the interconnecting member to the second rail through the weld-access orifice. An example of this assembly is shown in FIGS. 9-11. Weld-access orifices can be of different sizes or shapes than shown.

It will be appreciated that the members illustrated (e.g., the interconnecting members, side rails and cross-members) can be composed of various materials including, for example, steel, aluminum, magnesium, titanium, tungsten and reinforced polymer composites. Attachment techniques are not limited to MIG welding but can include laser welding, spot welding, brazing, the use of a fastener, soldering, clinging or crimping. Interconnecting members and rails can be formed using manufacturing techniques including, molding, casting, lathing, hydro-forming, stamping or an extrusion processes.

The material composition of each member can be changed from those disclosed with respect to the illustrated embodiments. For example, in some embodiments the rails are composed of titanium or a reinforced polymer. Any one of the side rails or interconnecting members can commonly be composed of the same material or different material. As taught, the weld-compatibility of the interconnecting member and the side rail are taken into consideration.

It should also be appreciated that the terms "material" and "material composition" are inexact approximations. Any items referred to as having a same material composition includes any items with substantially the same material composition, material properties, or performance characteristics.

It will also be appreciated that interconnecting members can be of any size, shape or configuration and are not limited to tubes or cups. For example, in other embodiments, interconnecting members are rectangular in shape.

Those familiar with the art to which this invention relates will recognize various alternative designs and embodiments for practicing the invention within the scope of the appended claims.

We claim:

1. A vehicle frame assembly, comprising:
 a steel first rail;
 an aluminum second rail;
 a side rail coupled to the second rail such that a central axis of the second rail intersects a central axis of the side rail; and
 an interconnecting member having a first linear hollow sleeve with a first end overlapping and fastened to a first end of a second linear hollow sleeve, a second end of the first sleeve being overlapped with and welded to the first rail and a second end of the second sleeve being overlapped with and welded to the second rail.

2. The frame assembly of claim 1, wherein the first sleeve is composed of steel; and wherein the second sleeve includes aluminum.

3. The frame assembly of claim 1, wherein the first sleeve is fastened to the second sleeve by a rivet.

4. The frame assembly of claim 1, wherein the first rail has a first central axis, the second rail has a second central axis, and the interconnecting member has a third central axis, the first, second, and third central axes being collinear.

5. The frame assembly of claim 1, wherein the first rail does not overlap the second rail.

6. An interconnecting member for collinearly joining vehicle structural rails composed of different materials, comprising:
 a first linear tubular portion having a first generally cylindrical profile and being weld-compatible with a first material; and
 a second linear tubular portion having a second generally cylindrical profile and being weld-compatible with a second material; wherein a first end of the second portion is overlapped with and fastened via rivets to a first end of the first portion.

7. The interconnecting member of claim 6, wherein the first portion is a receptor at least partially configured to receive a vehicle structural rail therein.

8. The interconnecting member of claim 6, wherein the second portion is a receptor at least partially configured to receive a vehicle structural rail therein.

9. The interconnecting member of claim 6, wherein the first end of the second linear tubular portion has an internal diameter that corresponds with an external diameter of the first end of the first linear tubular portion.

10. A vehicle rail assembly comprising:
 a first linear rail;
 a first linear sleeve extension fitted about and welded to an end of the first rail to project past the end of the first rail;
 a second linear rail composed of a differing material from the first rail; and
 a second linear sleeve extension fitted about and welded to an end of the second rail to project past the end of the second rail, wherein the first sleeve extension has an inner diameter corresponding to an external diameter of the second sleeve extension, the second sleeve extension is inserted into the first sleeve extension to form an overlapped region, and the first and second sleeve extensions are joined with a rivet at the overlapped region, such that the first and second rails are arranged collinearly.

11. The vehicle rail assembly of claim 10, wherein the first rail and first sleeve extension are made of steel and the second rail and second sleeve extension are made of aluminum.

12. The vehicle rail assembly of claim 10, wherein the first rail, first sleeve extension, second rail, and second sleeve extension extend generally axisymmetrically along a common central axis.

13. The vehicle rail assembly of claim 12, further comprising a third rail having a second central axis, the third rail being coupled to the first rail or second rail such that the common central axis intersects the second central axis.

* * * * *